(12) United States Patent
McGrew, Jr. et al.

(10) Patent No.: US 10,707,718 B2
(45) Date of Patent: Jul. 7, 2020

(54) ELECTRIC MOTOR STATOR ASSEMBLY WITH CAPTURED RETENTION FEATURE

(71) Applicant: GM GLOBAL TECHNOLOGY OPERATIONS LLC, Detroit, MI (US)

(72) Inventors: Arthur L. McGrew, Jr., Indianapolis, IN (US); Huaxin Li, Rochester Hills, MI (US); John S. Agapiou, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 431 days.

(21) Appl. No.: 15/442,745

(22) Filed: Feb. 27, 2017

(65) Prior Publication Data

US 2018/0248439 A1 Aug. 30, 2018

(51) Int. Cl.
| | |
|---|---|
| *H02K 5/04* | (2006.01) |
| *H02K 1/18* | (2006.01) |
| *H02K 7/116* | (2006.01) |
| *B60L 50/50* | (2019.01) |
| *B60K 6/445* | (2007.10) |
| *B60K 6/26* | (2007.10) |
| *B60K 6/36* | (2007.10) |

(52) U.S. Cl.
CPC ............... *H02K 5/04* (2013.01); *H02K 1/185* (2013.01); *H02K 7/116* (2013.01); *B60K 6/26* (2013.01); *B60K 6/36* (2013.01); *B60K 6/445* (2013.01); *B60L 50/50* (2019.02); *B60L 2220/50* (2013.01); *B60Y 2200/92* (2013.01); *B60Y 2400/60* (2013.01); *Y10S 903/906* (2013.01); *Y10S 903/909* (2013.01)

(58) Field of Classification Search
CPC ............ H02K 1/185; H02K 1/18; H02K 5/04; H02K 5/00; H02K 5/02; H02K 5/06; H02K 5/08; H02K 7/09; H02K 1/182; H02K 5/24; H02K 7/116; F16C 32/047; B60L 50/50; B60L 2220/50; B60K 6/26; B60K 6/36; B60K 6/446; B60Y 2200/92; B60Y 2400/60; Y10S 903/906; Y10S 903/909
USPC ........... 310/89, 415, 431–433, 427, 216.127, 310/216.129, 88, 83, 87, 216.136, 310/216.113, 216.118
See application file for complete search history.

(56) References Cited

U.S. PATENT DOCUMENTS 4,227,109 A * 10/1980 Mulach ................... H02K 1/16
310/216.114
10,112,231 B2 * 10/2018 Handwerker ........ B23K 20/122
(Continued)

FOREIGN PATENT DOCUMENTS

JP 2010178589 * 8/2010 ......... B23K 15/0006

*Primary Examiner* — Maged M Almawri
(74) *Attorney, Agent, or Firm* — Quinn IP Law

(57) ABSTRACT

An electric motor includes a stator assembly and a rotor configured to rotate within the stator assembly about an axis. The stator assembly includes a stator case having a channel and a laminate steel core having a retention feature aligned with the channel of the stator case. The stator case is fixed to the laminate steel core via displacement of material of the stator case at the channel toward the laminate steel core to capture the retention feature. An electro-mechanical drive-unit employing the above-described electric motor and a method of generating a stator assembly for such an electric motor are also contemplated.

4 Claims, 6 Drawing Sheets

(56) References Cited

U.S. PATENT DOCUMENTS

| | | | | |
|---|---|---|---|---|
| 2003/0214197 A1* | 11/2003 | De Luca | ............... | H02K 1/148 |
| | | | | 310/216.084 |
| 2010/0021321 A1* | 1/2010 | Koike | ............... | F04B 39/0044 |
| | | | | 417/410.3 |
| 2012/0153749 A1* | 6/2012 | Chun | ................. | H02K 1/185 |
| | | | | 310/59 |
| 2014/0265683 A1* | 9/2014 | Hossain | ............... | H02K 1/185 |
| | | | | 310/89 |
| 2014/0354107 A1* | 12/2014 | Alfermann | ............ | H02K 15/14 |
| | | | | 310/216.113 |
| 2015/0069865 A1* | 3/2015 | Alfermann | ............... | H02K 9/19 |
| | | | | 310/54 |
| 2017/0182587 A1* | 6/2017 | Tokoro | ............... | B23K 20/129 |
| 2018/0043420 A1* | 2/2018 | Handwerker | ...... | B23K 20/1275 |

* cited by examiner

FIG. 10
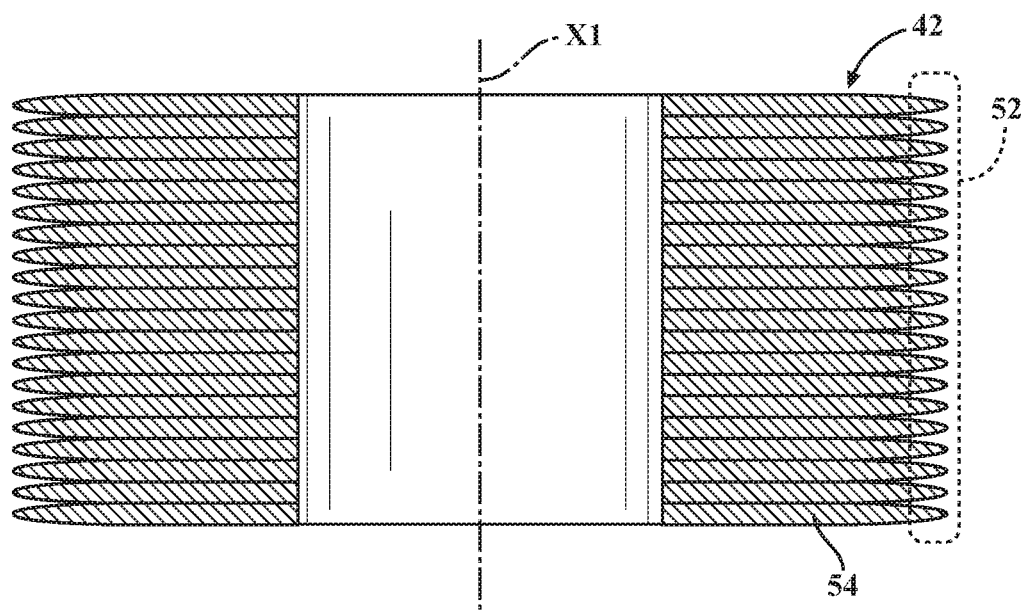
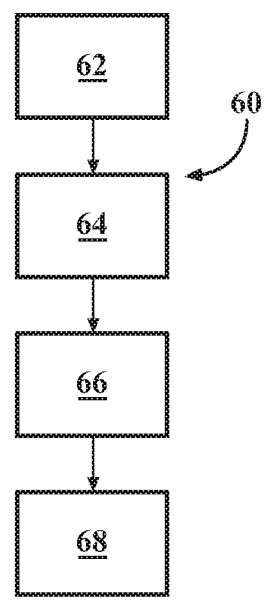
FIG. 11

ELECTRIC MOTOR STATOR ASSEMBLY WITH CAPTURED RETENTION FEATURE

INTRODUCTION

The disclosure relates to a stator assembly for an electric motor.

An electric motor is a type of a machine that converts electric energy into mechanical energy. Electric motors may be configured as an alternating current (AC) or a direct current (DC) type. Electric motors operate through interacting magnetic fields and current-carrying conductors to generate force. Recent technological advances have facilitated development of compact, high-power electric motors for high-volume applications, such as for powering a vehicle, i.e., a hybrid or electric vehicle.

A stator is the stationary part of a rotor system found in electric motors. The stator may either include permanent magnets or electromagnet windings formed from magnet bars or wires. Depending on the configuration of the electric motor, the stator may act as a field magnet for interacting with an armature to generate motion, or it may act as the armature, receiving its influence from moving field coils on the rotor.

SUMMARY

An electric motor includes a stator assembly and a rotor configured to rotate within the stator assembly about an axis. The stator assembly includes a stator case having a channel and a laminate steel core having a retention feature aligned with the channel of the stator case. The stator case is fixed to the laminate steel core via material of the channel displaced toward the laminate steel core and thereby capturing the retention feature.

The material of the stator case at the channel may be displaced toward the laminate steel core and capture the retention feature via Friction Stir Processing (FSP).

The retention feature of the laminate steel core may be a keyway or a slot.

The material of the stator case at the channel may be displaced toward and into the keyway.

The retention feature of the laminate steel core may be a tab or a projection extending into the channel of the stator case. The tab may be defined by two opposing sides and a third side connecting the two opposing sides.

The material of the stator case at the channel may be displaced toward the two opposing sides of the tab to capture the laminate steel core.

The material of the stator case at the channel may be displaced toward the third side of the tab to capture the laminate steel core.

An electro-mechanical drive-unit employing the above-described electric motor and a method of generating a stator assembly for such an electric motor are also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 10 is a detailed cross-sectional side view of the laminate core shown in FIG. 5.

FIG. 11 is a flow diagram of a method of generating a stator assembly for an electric motor shown in FIGS. 1 and 2.

DETAILED DESCRIPTION

Figure 1:
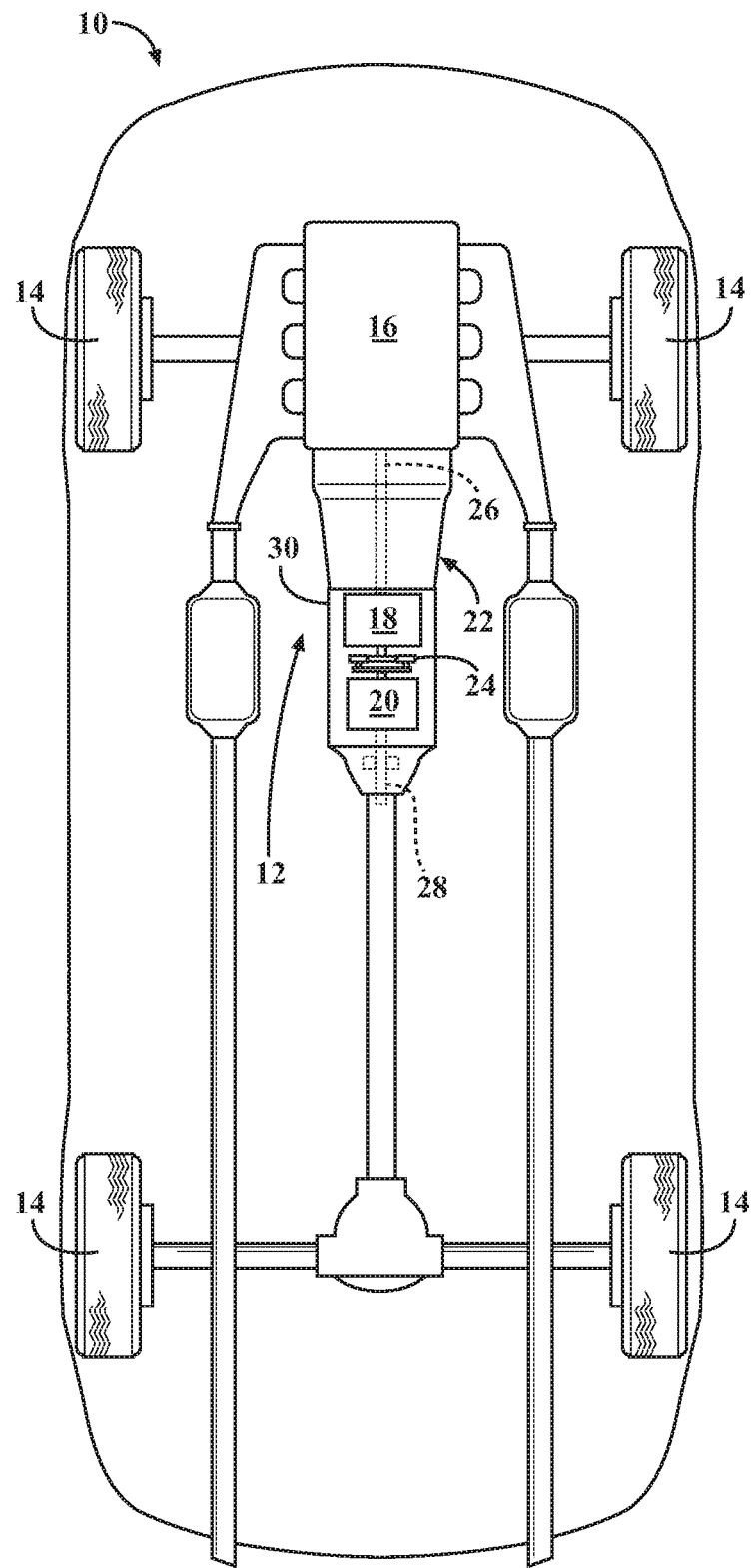
FIG. 1 is a schematic illustration of a hybrid electric vehicle employing an electrically variable transmission (EVT) having at least one motor/generator.

Referring to the drawings, wherein like reference numbers refer to like components, FIG. 1 illustrates a vehicle 10. The vehicle 10 includes a hybrid powertrain 12 configured to launch and propel the vehicle, i.e., to operate the vehicle in speed ranges between low and high road speeds via drive wheels 14. As shown, the hybrid powertrain 12 includes multiple power sources, which may include an internal combustion engine 16, a first electric motor/generator 18, and a second electric motor/generator 20. The engine 16 is operatively connected to an electro-mechanical drive-unit that is depicted as an "electrically variable transmission" (EVT) 22. As additionally shown, first and second electric motor/generators 18, 20 are physically disposed inside the EVT 22.

An "electrically variable transmission" constitutes a gearing arrangement 24, which is typically configured as a transmission planetary gear train, operatively connected to each of the engine 16, the first motor/generator 18, and the second motor/generator 20. Channeling respective torques of the engine 16 and the two motor/generators 18 and 20 to different members of the planetary gear train permits one of the power sources to either assist or balance the operation of one or both of the other two. Thus, the combination of one engine 16 and two motor/generators 18 and 20 operatively connected to the EVT 22 allows speeds and torques of the engine and motor/generators to be controlled and selected independently in order to power the vehicle 10 more efficiently.

The vehicle 10 additionally includes an energy storage system having one or more batteries (not shown). The energy storage system is operatively connected to the motor/generators 18 and 20 such that the motor/generators may transfer torque to or receive torque from the engine 16. Although not shown, the vehicle 10 also includes a controller or an electronic control unit (ECU). The controller is operatively connected to the power sources and to the energy storage system for controlling the distribution of torque from the power sources to the gearing arrangement 24.

Although the hybrid powertrain 12 as shown includes the engine 16, the EVT 22 may also be connectable solely to the first and second electric motor/generators 18, 20. In such a case, the powertrain 12 would no longer be a hybrid type, but would become purely electric, and the EVT 22 may then be broadly described as an electro-mechanical drive-unit. For simplicity and clarity, the remainder of the present description will refer to the electro-mechanical drive-unit EVT 22 as being connected to the engine 16, as well as to the motor/generators 18, 20. Additionally, the connections of the hybrid powertrain 12, to be described in greater detail below, may permit an overall decrease in torque requirement from the combination of the first and the second motor/generators 18 and 20 while affording acceptable vehicle performance, as compared with other systems.

Figure 2:
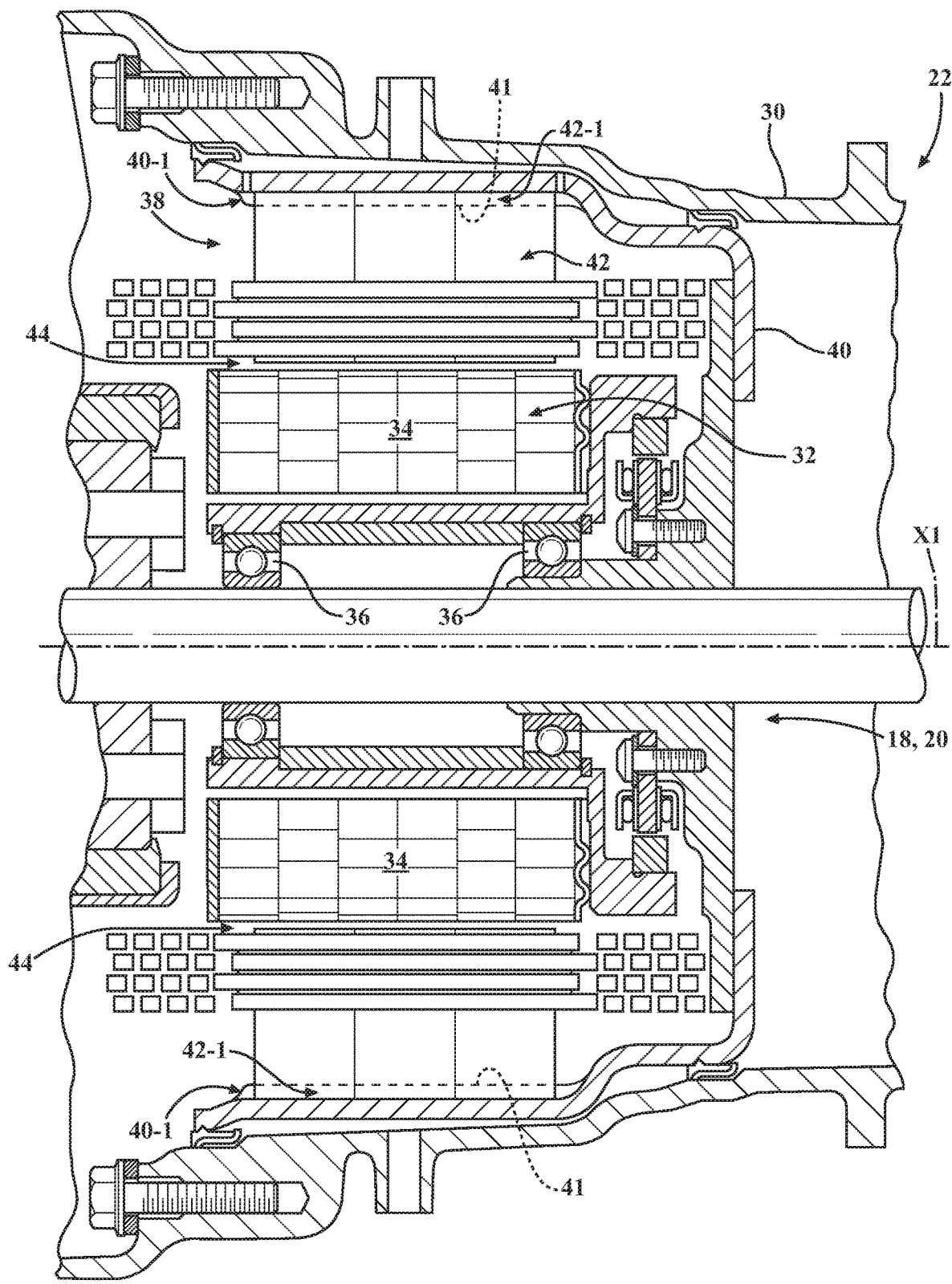
FIG. 2 is a schematic partial close-up cross-sectional side view of the EVT shown in FIG. 1, depicting a stator assembly having a stator case fixed to a laminate core in a representative motor/generator according to the disclosure.

As shown in FIG. 2, the EVT 22 includes an input member 26 which may be operatively connected to the engine 16 and an output member 28 which may be operatively connected to the drive wheels 14. The EVT 22 also includes a drive-unit housing 30 that retains internal components of the EVT and also functions as a stationary member to which certain torque transmitting devices (not shown) may be grounded on demand to affect shifts between distinct gear ratios. The gearing arrangement 24 is operatively connected to each of the input and output members 26, 28.

With continued reference to FIG. 2, each of the first and second electric motor/generators 18, 20 includes a rotor 32 employing conductors 34. The rotor 32 is supported for rotation by bearings 36 and operatively connected to the gearing arrangement 24. Each of the first and second electric motor/generators 18, 20 also includes a stator assembly 38. The stator assembly 38 generally surrounds the rotor 32 and is fixed with respect to the drive-unit housing 30. The stator assembly 38 includes a stator case 40 and a laminate steel core 42. The stator case 40 may be constructed from aluminum, steel, as well as from other formable, high-strength materials. The laminate steel core 42 is assembled with, i.e., inserted into, the stator case 40 and fixed therein. Accordingly, the rotor 32 is configured to rotate inside the stator assembly 38 with respect to an axis X1 in each of the subject electric motor/generators 18, 20 during pertinent operation of the hybrid powertrain 12. A clearance or air gap 44 is defined, i.e., present, between the rotor 32 and the laminate steel core 42 for no-contact rotation between the rotor 32 and the stator 38.

As shown in FIGS. 2-5, the stator case 40 defines a bore 41 configured to accept the laminate core 42. The stator case 40 also includes a channel or groove generally indicated in FIG. 2 with numeral 40-1. The laminate core 42 has a retention feature generally indicated in FIG. 2 with numeral 42-1. In the stator assembly 38, the retention feature 42-1 is aligned with the channel 40-1 of the stator case 40, such that channel 40-1 and the retention feature 42-1 correspond to and cooperate with one another for fixing the laminate core 42 to the stator case 40. Specifically, the channel 40-1 and the retention feature 42-1 match up at an interface 46. The stator case 40 is fixed or fastened to the laminate core 42 at the interface 46 via material of the channel 40-1 displaced toward the laminate core 42 and thereby capturing the retention feature 42-1. Accordingly, such displacement of the stator case 40 material is intended to secure the stator case to the laminate core 42 by generating an unyielding connection therebetween. Such displacement of the stator case 40 may be performed via solid-state Friction Stir Processing (FSP).

In general, FSP is a method of changing the properties of a metal through intense, localized plastic deformation. The desired deformation is produced by forcibly inserting a non-consumable tool 48 (shown in FIGS. 4, 6, and 7) into the workpiece, such as the stator case 40, and revolving the tool in a stirring motion as the tool is pushed laterally through the workpiece. When implemented, FSP mixes material of the workpiece without changing the material's phase, whether by melting or otherwise, and generates a microstructure with fine, equiaxed, i.e., having axes of approximately the same length, grains. The resultant homogeneous grain structure, separated by high-angle boundaries, may permit some aluminum alloys to take on superplastic properties. Additionally, FSP typically enhances the tensile strength and fatigue strength of the base material. During displacement of stator case 40 via FSP, the tool 48 is rotated and fed along the surface of the channel 40-1. Generally, as the tool 48 is rotated and fed along the surface of the channel 40-1, a leading face of the tool forces the plasticized material of the stator case 40 to a back side of the tool, while applying a substantial forging force to consolidate the displaced material at the interface 46.

Figure 3:
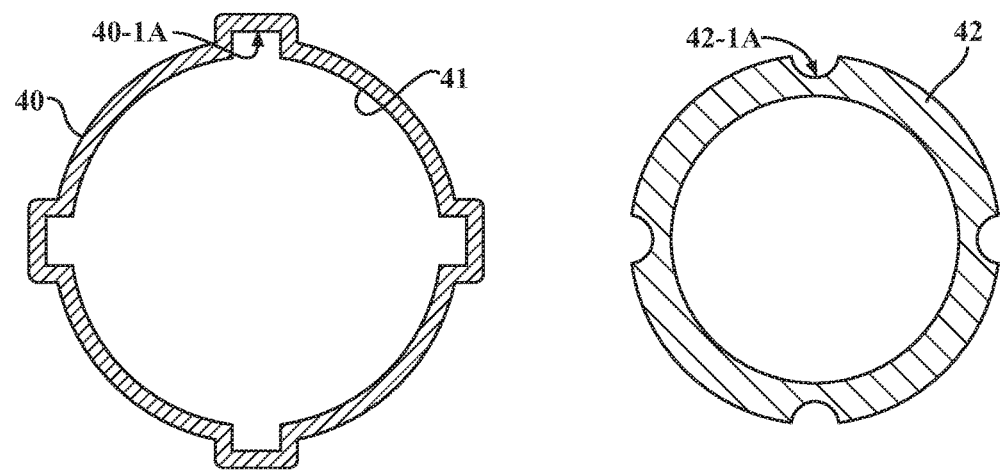
FIG. 3 is a schematic partial front cross-sectional view of one embodiment of the stator assembly shown in FIG. 2.
Figure 4:
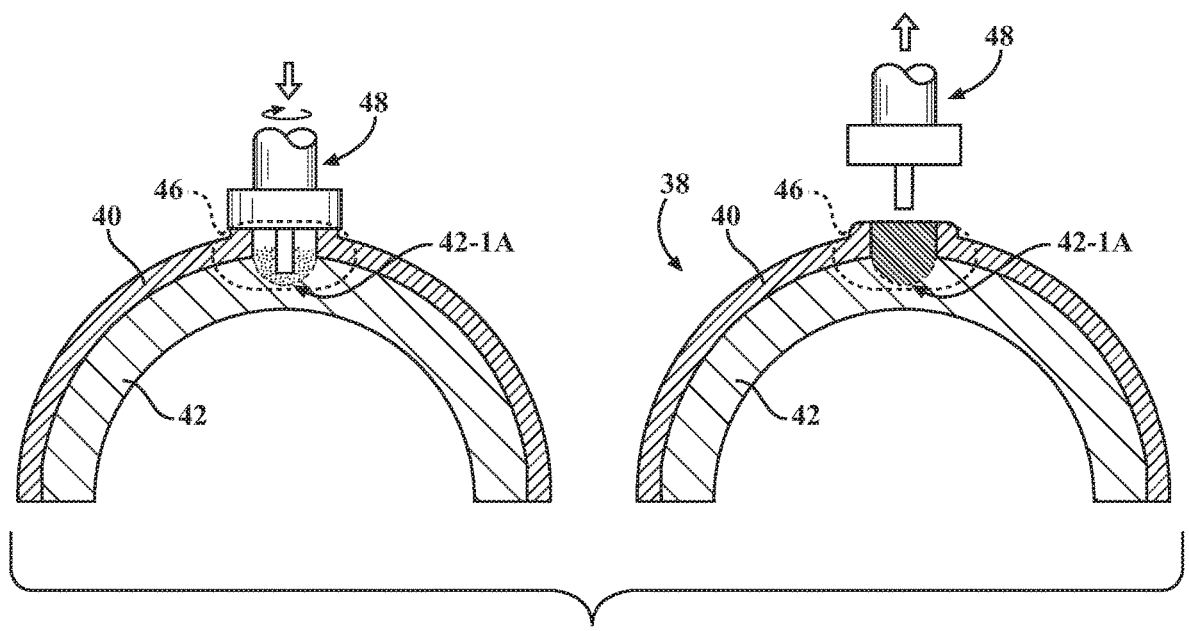
FIG. 4 is a schematic partial front cross-sectional view of the embodiment of the stator assembly shown in FIG. 3, depicting Friction Stir Processing (FSP) being used to fix the stator case to the laminate core to generate the subject stator assembly.
Figure 5:
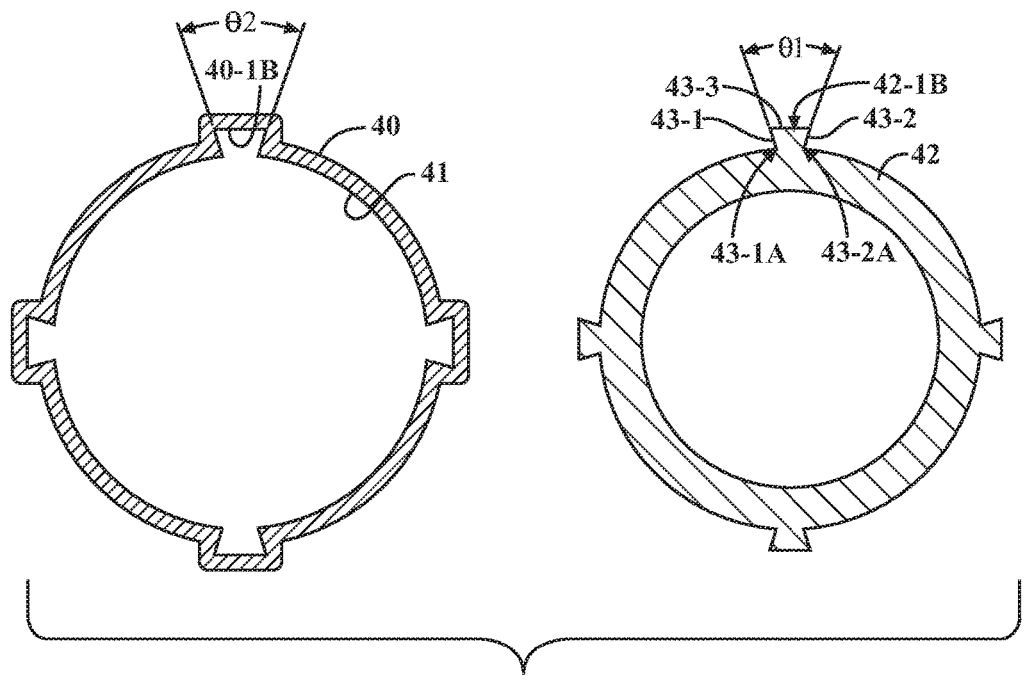
FIG. 5 is a schematic partial front cross-sectional view of another embodiment of the stator assembly shown in FIG. 2.

As shown in FIGS. 3 and 4, the channel 40-1 may be configured as a channel 40-1A having a substantially parallelogram shape, while the laminate steel core retention feature 42-1 may be configured as a keyway or a slot 42-1A. Accordingly, in such an embodiment, the material of the stator case 40 at the channel 40-1A will be displaced toward and into the keyway 42-1A. In a separate embodiment shown in FIGS. 5-7, the channel 40-1 may be configured as a channel 40-1B. The retention feature 42-1 may be configured as a tab or a projection 42-1B configured to match a channel 40-1B. The tab 42-1B is defined by two opposing sides 43-1 and 43-2, and a third side 43-3 connecting the two opposing sides. Furthermore, the channel 40-1B may have a dovetail shape and the tab 42-1B may be configured as a dove tail, such that the sides 43-1 and 43-2 are arranged at an angle θ1 and substantially match an angle θ2 of the channel 40-1B (shown in FIG. 5). Alternatively, the tab 42-1B may be configured with parallel sides 43-1 and 43-2 to match parallel sides of the channel 40-1B (not shown).

Figures 6, 7:
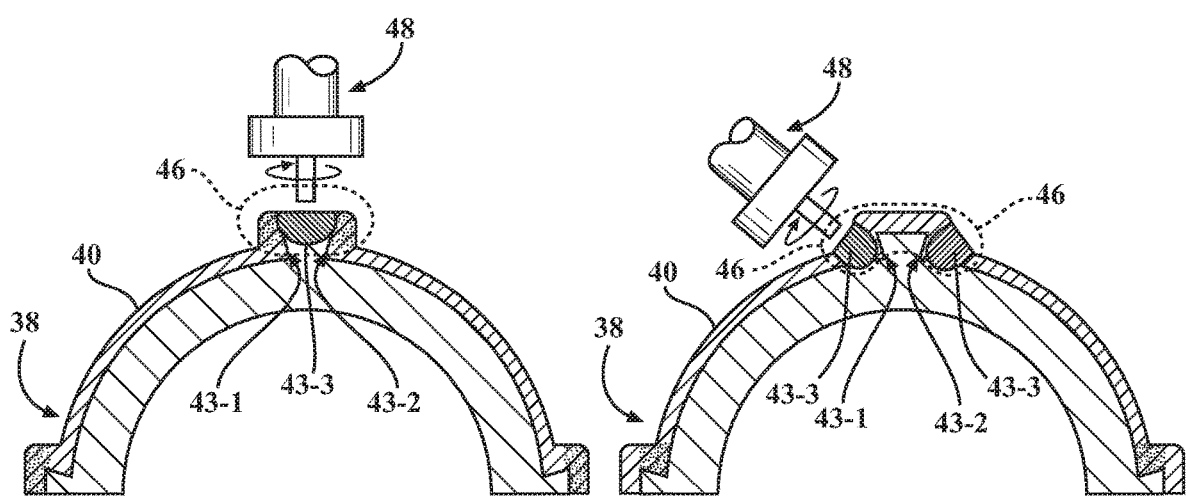
FIG. 6 is a schematic partial front cross-sectional view of the embodiment of the stator assembly shown in FIG. 5, depicting FSP being used to generate the subject stator assembly.
FIG. 7 is a schematic partial front cross-sectional view of yet another embodiment of the stator assembly shown in FIG. 5, also depicting FSP being used to generate the subject stator assembly.

As shown, the tab 42-1B extends into the channel 40-1B. In the embodiment of the retention feature 42-1 being configured as the tab 42-1B, as shown in FIG. 6, during fastening of the stator case 40 to the laminate core 42, the material of the stator case 40 at the channel 40-1B may be displaced toward the two opposing sides 43-1, 43-2, such as at respective corners 43-1A and 43-2A, to thereby capture the laminate core. Such displacement of the channel 40-1B toward the two opposing sides 43-1, 43-2 may be affected during separate applications of the tool 48 at the individual corners 43-1A and 43-2A. Furthermore, as shown in FIG. 7, the material of the stator case 40 at the channel 40-1B may be displaced solely toward the third side of the tab 43-3 or in addition to being displaced toward the two opposing sides 43-1, 43-2.

Figure 8:
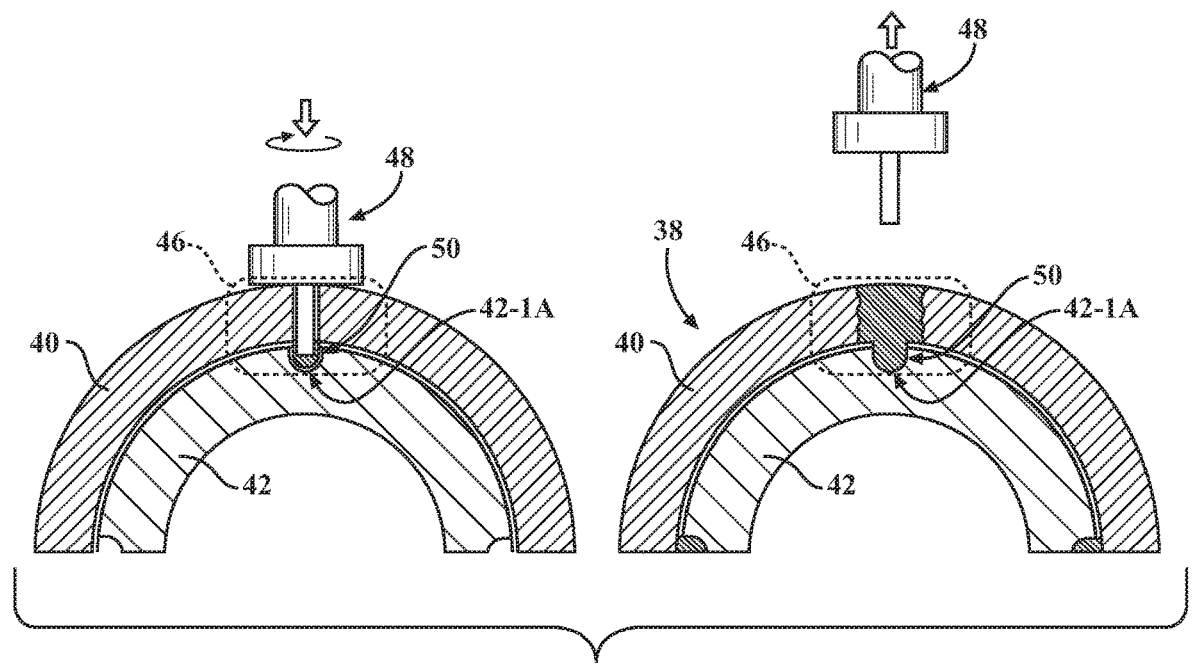
FIG. 8 is a schematic partial front cross-sectional view of the stator assembly shown in FIG. 5, depicting an embodiment of a separate key rod inserted in an interface between the stator case and the laminate core.
Figure 9:
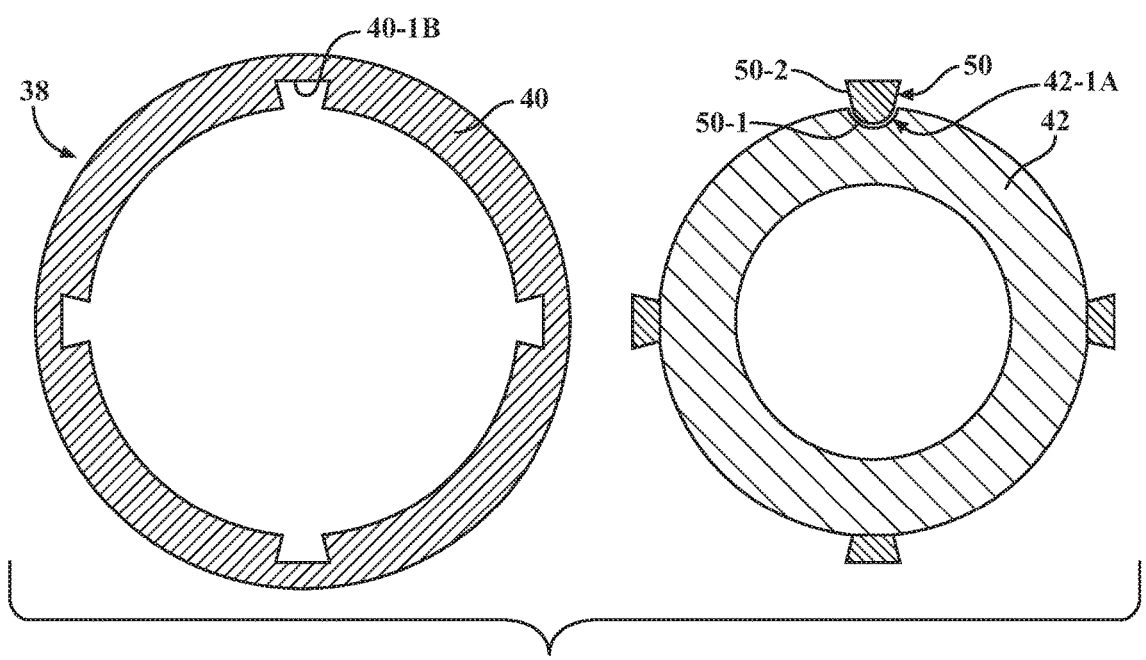
FIG. 9 is a schematic partial front cross-sectional view of the stator assembly shown in FIG. 5, depicting another embodiment of the separate key rod at the interface between the stator case and the laminate core.

An additional set of embodiments is illustrated in FIGS. 8-9. As shown in FIG. 8, the stator assembly 38 may include a key rod 50 having a shape that is complementary to the slot 42-1A embodiment of the retention feature 42-1. The rod 50 may be inserted between the stator case 40 and the laminate core 42 into the slot 42-1A, and FSP may be used to weld the rod 50 to the stator case 40 and displace the material of the rod into the channel 40-1. Such a process may fill the channel 40-1 in the stator case 40 with the material of the rod 50 and/or the material of the slot 42-1A, thereby fastening the stator case 40 to the laminate core 42 for retention of the stator assembly 38 at the interface 46. As a result, the stator case 40 may be fixed or fastened to the laminate core 42 at the interface 46 via material of the channel 40-1 being displaced toward the laminate core 42 and thereby capturing the retention feature 42-1.

As shown in FIG. 9, the key rod 50 may alternatively have a first portion 50-1 with a shape complementary to the slot 42-1A and also have a second portion 50-2 extending out of the slot 42-1A and into the channel 40-1. In such an embodiment, the rod 50 engages with both the channel 40-1 in the stator case 40 and the slot 42-1A in the core 42. To facilitate a precision fit within the stator assembly 38, the second portion 50-2 may be shaped to complement the channel 40-1. FSP may be used to displace the material of the rod 50 within the corresponding aligned channel 40-1 and the slot 42-1A, or weld the rod within the channel 40-1 and displace the material in the 42-1A. The rod 50 may have various cross-sectional shapes or geometries, such as rectangular, dovetail, etc., at least in part depending on the physical size and packaging of the first and second motor/generators 18, 20. Furthermore, while the rod 50 may be a separate component as shown in FIGS. 8 and 9, the rod may be an integral part of the laminate stator core 42, which would generate a structure substantially identical to that of the embodiments illustrated in FIGS. 5-7.

One of the benefits of material displacement of retention feature 42-1 in the above construction, either with or without using the rod 50, is a resultant interlock of the stator case 40 with a surface 52 (shown in FIG. 10) of the laminate core 42 along the axis X1. The surface 52 is typically periodically wavy or serrated, and is thus established by rounded outer edges of individual laminations 54 via a die shearing process used in manufacturing the individual laminations. Therefore, the displaced material at the interface 46 in the above-described embodiments effectively interlocks with and retains the laminated core 42 within the stator case 40 radially, mostly through the retention feature 42-1, and axially, along the axis X1 through the interlock of the wavy surface 52 with the retention feature.

FIG. 11 depicts a method 60 of generating the stator assembly 38 for an electric motor, such as for the first and second motor/generators 18, 20, as described above with respect FIGS. 1-10. The method commences in frame 62 with forming a channel 40-1 into the stator case 40. The subject forming of the channel 40-1 may be accomplished by an appropriate net forming process such as casting, or a metal removal process, such as milling. Either after or concurrently with frame 62, the method proceeds to frame 64 with forming the retention feature 42-1 into a laminate steel core 42. Such forming of the retention feature 42-1 may be accomplished by stamping and/or a metal removal process. Although not specifically depicted in the figures, forming of the channel 40-1 into the stator case 40, as is forming of the channel 40-1 into the stator case 40, may be readily envisioned.

Following frame 64, the method advances to frame 66, where it includes inserting or assembling the laminate steel core 42 into the bore 41 of the stator case 40 via aligning the retention feature 42-1 with the channel 40-1. As described above with respect to FIGS. 1-10, the retention feature 42-1 may be configured as the keyway 42-1A, such that during assembly in frame 66 the keyway is aligned with the channel 40-1A. On the other hand, the retention feature 42-1 may be configured as the tab 42-1B defined by the two opposing sides 43-1, 43-2, and a third side 43-3 connecting the two opposing sides 43-1, 43-2. In such an embodiment, inserting the laminate steel core 42 into the stator case 40 includes initially aligning the two opposing sides 43-1, 43-2 and the third side 43-3 with the channel 40-1B. Furthermore, the stator assembly 38 may employ the key rod 50, as described with respect to FIGS. 8-9.

After frame 66, the method proceeds to frame 68. In frame 68, the method includes fixing the stator case 40 to the laminate steel core 42 at an interface 46 via displacing material of the stator case at the channel 40-1 toward the laminate steel core and thereby capturing the retention feature 42-1 to generate the stator assembly 38. Following frame 68, the completed stator assembly 38 may be assembled with the rotor 32 to form either first or second electric motor/generators 18, 20. As described with respect to FIGS. 1-10, such displacing of the stator case 40 material may be accomplished by Friction Stir Processing (FSP), specifically by rotating and feeding the tool 48 along the surface of the channel 40-1.

Additionally, the displacing material of the stator case 40 at the channel 40-1A may include displacing the material of the stator toward and into the keyway 42-1A. Alternatively, displacing material of the stator case 40 may include displacing the material of the stator case at the channel 40-1B toward the two opposing sides 43-1, 43-2 of the tab 42-1B and/or displacing the material of the stator case toward the third side 43-3 of the tab to thereby capture the laminate steel core 42. Such processing permits generation of a durable and cost-effective stator assembly 38 for use in an electric motor, such as the first and second motor/generators 18, 20 shown in FIG. 1.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An electric motor comprising:
  a stator assembly; and
  a rotor configured to rotate within the stator assembly about an axis;
  wherein:
    the stator assembly includes a stator case having a channel and a laminate steel core having a tab aligned with the channel of the stator case, wherein the channel has a dovetail shape and the tab has a dove tail shape configured to match and extend into the dovetail shape of the channel; and the stator case is fixed to the laminate steel core via material of the channel displaced toward the laminate steel core and thereby capturing the tab via Friction Stir Processing (FSP);

the tab is defined by two opposing sides and a third side connecting the two opposing sides; and the material of the stator case at the channel is displaced toward the two opposing sides of the tab via the FSP to capture the laminate steel core, such that the material of the stator case is mixed without changing the stator case material's phase, resulting in a microstructure of the material of the stator case at the channel having a homogeneous grain structure with fine, equiaxed grains and characterized by superplastic properties.

2. The electric motor according to claim 1, wherein the material of the stator case at the channel is displaced toward the third side of the tab via FSP to capture the laminate steel core.

3. An electro-mechanical drive-unit connectable with at least one power source for launching and propelling a vehicle, comprising:

an input member and an output member;

a drive-unit housing;

a gearing arrangement operatively connected to each of the input and output members; and an electric motor including:

a stator assembly fixed with respect to the drive-unit housing; and a rotor connected to the gearing arrangement and configured to rotate within the stator assembly about an axis; wherein:

the stator assembly includes a stator case having a channel and a laminate steel core having a tab aligned with the channel of the stator case, wherein the channel has a dovetail shape and the tab has a dove tail shape configured to match and extend into the dovetail shape of the channel; and the stator case is fixed to the laminate steel core via material of the channel displaced toward the laminate steel core and thereby capturing the tab via Friction Stir Processing (FSP);

the tab is defined by two opposing sides and a third side connecting the two opposing sides; and the material of the stator case at the channel is displaced toward the two opposing sides of the tab via the FSP to capture the laminate steel core such that the material of the stator case is mixed without changing the stator case material's phase, resulting in a microstructure of the material of the stator case at the channel having a homogeneous grain structure with fine, equiaxed grains and characterized by superplastic properties.

4. The electro-mechanical drive-unit according to claim 3, wherein the material of the stator case at the channel is displaced toward the third side of the tab via FSP to capture the laminate steel core.

\* \* \* \* \*